(12) United States Patent
Lee et al.

(10) Patent No.: US 11,549,662 B2
(45) Date of Patent: Jan. 10, 2023

(54) ILLUMINATION APPARATUS AND OPTICAL INSPECTION APPARATUS INCLUDING THE SAME

(71) Applicant: Samsung Display Co., LTD., Yongin-si (KR)

(72) Inventors: Jungmin Lee, Suwon-si (KR); Dongwoo Kim, Seoul (KR); Boyoung Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/539,754

(22) Filed: Dec. 1, 2021

(65) Prior Publication Data

US 2022/0333761 A1 Oct. 20, 2022

(30) Foreign Application Priority Data

Apr. 14, 2021 (KR) .................. 10-2021-0048592

(51) Int. Cl.
*F21V 7/04* (2006.01)
*F21V 3/00* (2015.01)

(52) U.S. Cl.
CPC . *F21V 7/04* (2013.01); *F21V 3/00* (2013.01)

(58) Field of Classification Search
CPC ........ F21V 3/00; F21V 3/0615; F21V 3/0625; F21V 5/00–005; F21V 7/00–05; F21V 7/0066; F21V 13/00–04; F21V 13/10; F21V 14/06–085; F21V 17/02
See application file for complete search history.

(56) References Cited

U.S. PATENT DOCUMENTS 6,783,257 B2 * 8/2004 Yoneda .............. G01N 21/8806
362/240

FOREIGN PATENT DOCUMENTS

| JP | 2001249083 A | * 9/2001 |
|---|---|---|
| KR | 10-2010-0129846 | 12/2010 |
| KR | 10-1114222 | 3/2012 |
| KR | 10-1248184 | 3/2013 |
| KR | 10-1363520 | 2/2014 |
| KR | 10-2015-0102145 | 9/2015 |
| KR | 10-1717730 | 3/2017 |
| KR | 10-1781418 | 9/2017 |

* cited by examiner

*Primary Examiner* — Jason M Han
(74) *Attorney, Agent, or Firm* — Kile Park Reed & Houtteman PLLC

(57) ABSTRACT

An illumination apparatus includes a main light source, a half mirror, and a diffusion plate. The main light source emits main light. The half mirror is spaced apart from the main light source. The half mirror reflects a first light travelling in a first direction among the main light source. The half mirror has a reflective surface reflecting the first light to travel in a second direction. The diffusion plate is disposed between the main light source and the half mirror not overlapping the reflective surface. The diffusion plate has a first horizontal surface and a second horizontal surface. The second horizontal surface is a rear surface of the first horizontal surface. The diffusion plate transmits a second light incident on the first horizontal surface among the main light. The diffusion plate scatters the second light from the second horizontal surface.

20 Claims, 10 Drawing Sheets

FIG. 1
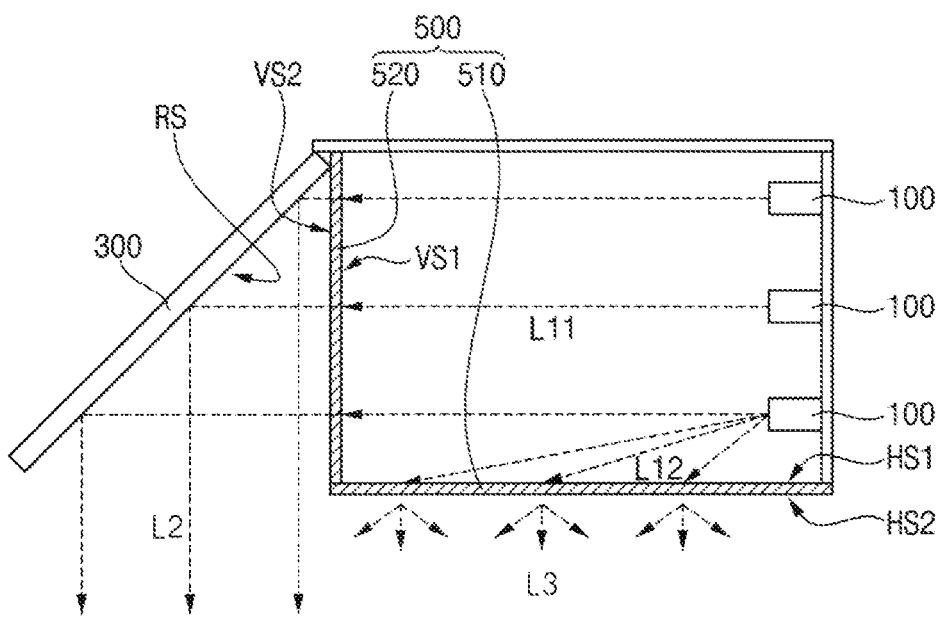

FIG. 7A
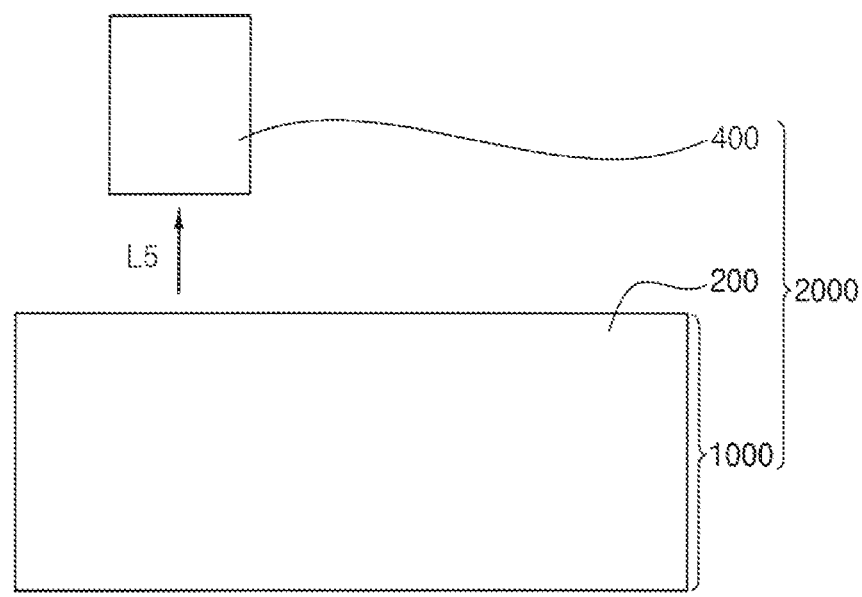
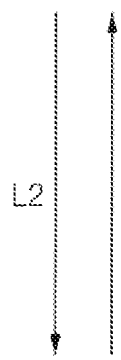
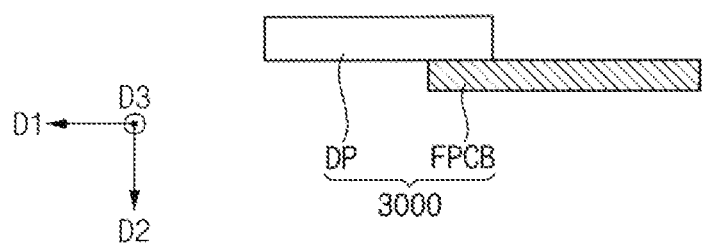

FIG. 7B
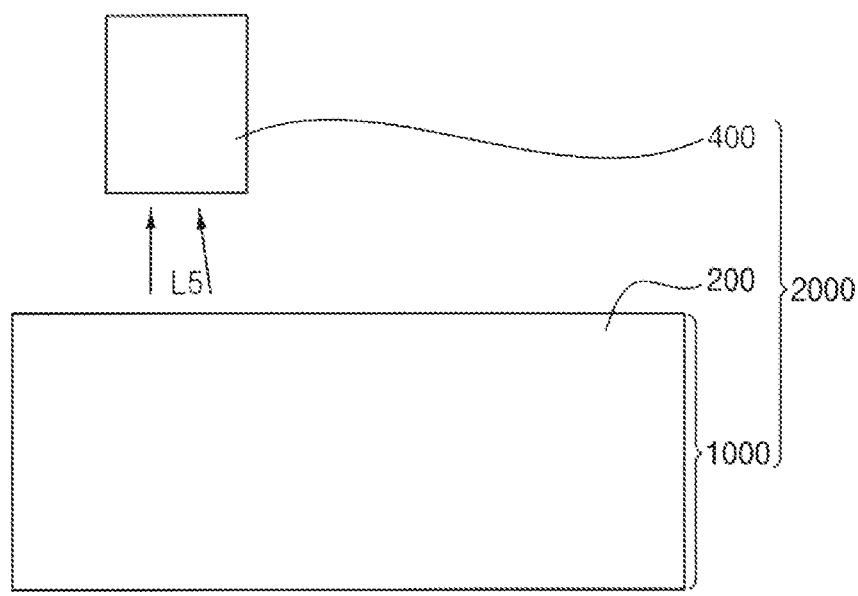
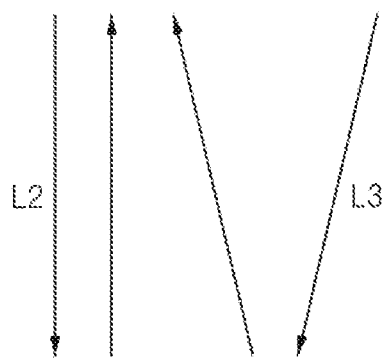
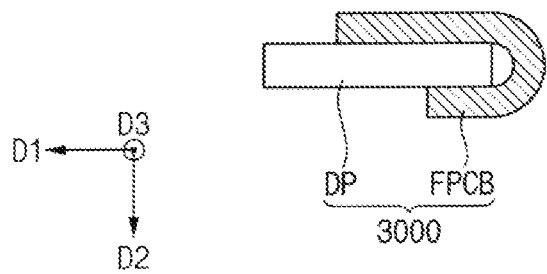

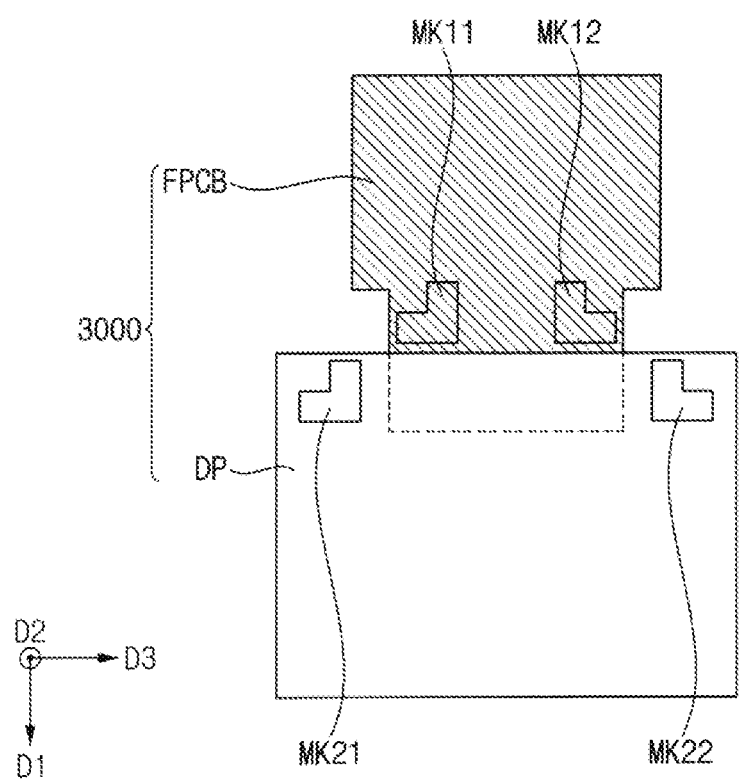

ILLUMINATION APPARATUS AND OPTICAL INSPECTION APPARATUS INCLUDING THE SAME

CROSS-REFERENCE TO RELATED APPLICATION(S)

This application claims priority to and benefits of Korean Patent Application No. 10-2021-0048592 under 35 U.S.C. § 119, filed on Apr. 14, 2021 in the Korean Intellectual Property Office, the entire contents of which are incorporated herein by reference.

BACKGROUND

1. Technical Field

The disclosure relates generally to an illumination apparatus and an optical inspection apparatus including the same. The disclosure relates to an illumination apparatus emitting light and an optical inspection apparatus including the same.

2. Description of the Related Art

An illumination apparatus may emit illumination light to foreign materials on a surface of an inspection object and marks such as characters or patterns formed on the surface of the inspection object.

An optical inspection apparatus may include the illumination apparatus and a camera. The illumination light of the illumination apparatus may be reflected from the surface of the inspection object, and the reflected illumination light may be incident on the camera. The camera may photograph the foreign material and the mark by using the incident light incident on the camera. Accordingly, the optical inspection apparatus may find a defect in the inspection object or inspect a quality of the inspection object.

The inspection object may have a flat upper surface and a curved side surface. The illumination apparatus that emits the illumination light at various angles has been developed. In order to minimize a size of the illumination apparatus, the illumination apparatus including a minimum light source may be required.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An embodiment provides an illumination apparatus with improved reliability.

An embodiment provides an optical inspection apparatus including the illumination apparatus.

According to an embodiment, an illumination apparatus may include a main light source emitting a main light; a half mirror spaced apart from the main light source, the half mirror including a reflective surface reflecting a first light travelling in a first direction among the main light to travel in a second direction; and a first diffusion plate disposed between the main light source and the half mirror, the first diffusion plate not overlapping the reflective surface of the half mirror, the first diffusion plate including a first horizontal surface and a second horizontal surface. The second horizontal surface may be a rear surface of the first horizontal surface. The first diffusion plate may transmit a second light incident on the first horizontal surface of the first diffusion plate among the main light. The first diffusion plate may scatter the second light from the second horizontal surface of the first diffusion plate.

According to an embodiment, the second light may travel in a direction different from the first direction and the second direction.

According to an embodiment, the first diffusion plate may be parallel to the first direction and adjacent to the main light source.

According to an embodiment, the illumination apparatus may further include a second diffusion plate disposed between the half mirror and the first diffusion plate.

According to an embodiment, the second diffusion plate may include a first vertical surface facing the main light source; and a second vertical surface facing the half mirror.

According to an embodiment, the second diffusion plate may overlap the reflective surface of the half mirror in the first direction.

According to an embodiment, a side of the second diffusion plate may be adjacent to the half mirror. Another side of the second diffusion plate may be adjacent to the first diffusion plate.

According to an embodiment, the first diffusion plate may contact the second diffusion plate.

According to an embodiment, the illumination apparatus may further include a transfer member moving the main light source in the first direction.

According to an embodiment, the transfer member may include a head part connected to the main light source; a cylinder part connected to the head part and adjusting a length of the cylinder part in the first direction; and a base part connected to the cylinder part and fixed at a preset position.

According to an embodiment, the illumination apparatus may further include an auxiliary light source disposed on the first diffusion plate, the auxiliary light source emitting an auxiliary light in the second direction.

According to an embodiment, the auxiliary light source may be disposed between the main light source and the half mirror.

According to an embodiment, an optical inspection apparatus may include an illumination apparatus that may include a main light source emitting a main light; a half mirror spaced apart from the main light source, the half mirror including a reflective surface reflecting a first light travelling in a first direction among the main light to travel in a second direction; and a first diffusion plate disposed between the main light source and the half mirror, the first diffusion plate not overlapping the reflective surface of the half mirror, the first diffusion plate including a first horizontal surface and a second horizontal surface; a case accommodating the illumination apparatus; and a camera disposed outside of the case and disposed on the half mirror. The second horizontal surface may be a rear surface of the first horizontal surface. The first diffusion plate may transmit a second light incident on the first horizontal surface of the first diffusion plate among the main light. The first diffusion plate may scatter the second light from the second horizontal surface of the first diffusion plate.

According to an embodiment, the camera may overlap the half mirror.

According to an embodiment, an upper surface of the case may include an upper opening. A lower surface of the case may include a first lower opening facing the upper opening; and a second lower opening spaced apart from the first lower opening of the lower surface of the case.

According to an embodiment, the half mirror may be disposed between the upper opening and the first lower opening of the lower surface of the case.

According to an embodiment, the first diffusion plate may be disposed in the second lower opening of the lower surface of the case.

According to an embodiment, the illumination apparatus may further include a transfer member moving the main light source in the first direction.

According to an embodiment, the illumination apparatus may further include an auxiliary light source disposed on the first diffusion plate, the auxiliary light source emitting an auxiliary light in the second direction.

According to an embodiment, the auxiliary light source may be disposed between the main light source and the half mirror. The auxiliary light source may be disposed on the upper surface of the case.

The illumination apparatus may include the main light source and the half mirror. The main light source may emit the main light. The illumination apparatus may have a coaxial lighting effect by using the first light among the main lights of the main light source.

The illumination apparatus may include the first diffusion plate. The first diffusion plate may be disposed parallel to a plane. The first diffusion plate may be disposed to not overlap the reflective surface of the half mirror. The first diffusion plate may be adjacent to the main light source. The first diffusion plate may uniformly scatter the second light among the main light. By uniformly scattering the second light by the first diffusion plate, the illumination apparatus may have a side lighting effect of illuminating at various angles. The illumination apparatus may have the side lighting effect without including a separate light source for the side lighting effect. Although a size of the illumination apparatus is minimized, the illumination apparatus may have the uniform side lighting effect.

The illumination apparatus may include the transfer member for linearly moving the main light source. As the main light source moves on the first diffusion plate by the transfer member, a light amount of the first light and the light amount of the second light may be adjusted. The light amount of the first light may be maximized without the second light, and the light amount of the first light and the light amount of the second light may be selected as needed. An efficiency of the main light may be improved.

The illumination apparatus may include the auxiliary light source emitting the auxiliary light. The light amount of the scattered light scattered by the first diffusion plate may increase. The side lighting effect may be maximized.

The illumination apparatus may have only the coaxial lighting effect or may have the coaxial lighting effect and the side lighting effect simultaneously. A reliability of the illumination apparatus may be improved.

It is to be understood that both the foregoing general description and the following detailed description are examples that are intended to provide further explanation of the disclosure.

BRIEF DESCRIPTION OF THE DRAWINGS

The accompanying drawings, which are included to provide a further understanding of the disclosure and are incorporated in and constitute a part of this specification, illustrate embodiments of the disclosure, and together with the description serve to explain the disclosure. In the drawings:

FIG. 1 is a schematic diagram illustrating an illumination apparatus according to an embodiment.

FIGS. 7A and 7B are schematic diagrams illustrating an inspection method using the optical inspection apparatus of FIG. 6.

FIG. 8 is a schematic plan view of an inspection object of FIG. 7A being photographed through an optical inspection apparatus.

DETAILED DESCRIPTION OF THE EMBODIMENTS

Figure 2:
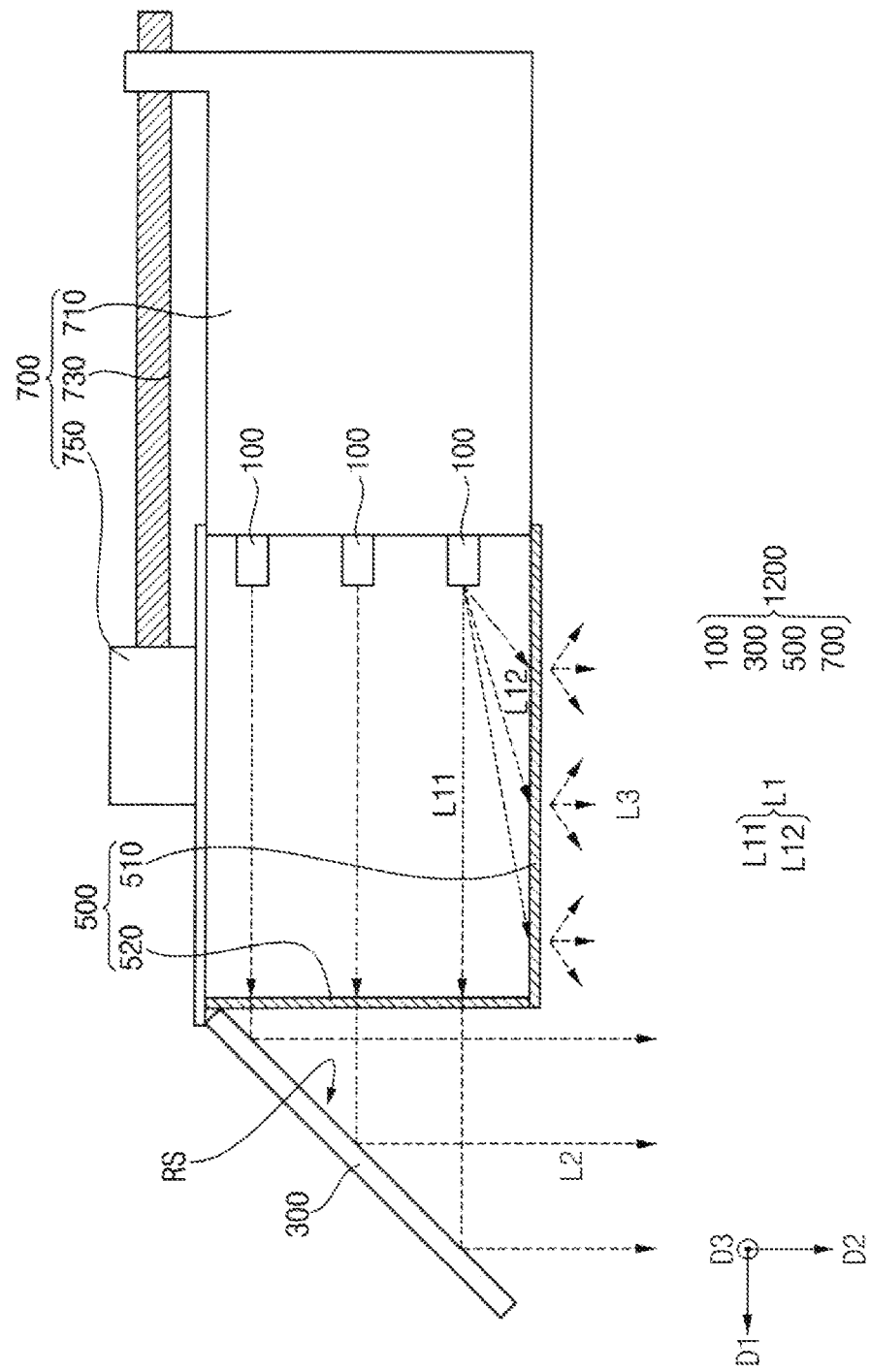
FIG. 2 is a schematic diagram illustrating an illumination apparatus according to an embodiment.

Illustrative, non-limiting embodiments will be more clearly understood from the following detailed description in conjunction with the accompanying drawings.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram illustrating an illumination apparatus 1100 according to an embodiment.

Referring to FIG. 1, a plane may be defined by a first direction D1 and a third direction D3 perpendicular to the first direction D1. A second direction D2 may be perpendicular to the plane. The first direction D1 may be perpendicular to the second direction D2.

The illumination apparatus 1100 may include a main light source 100, a half mirror 300, and a first diffusion plate 510.

The main light source 100 may include a light emitting diode. The main light source 100 may emit a main light or illumination light L1. The main illumination light L1 may include a first light or illumination light L11 traveling in the first direction D1 and a second light or illumination light L12 traveling in a direction different from the first and second directions D1 and D2.

The half mirror 300 may be disposed to be spaced apart from the main light source 100. The half mirror 300 may be spaced apart from the main light source 100 in the first direction D1. The half mirror 300 may have a reflective surface RS that reflects the first illumination light L11 in the second direction D2. Accordingly, the half mirror 300 may reflect the first illumination light L11 in the second direction D2. A reflected light L2 reflected from the half mirror 300 may travel in the second direction D2. For example, the reflective surface RS may be inclined by approximately 45° to the plane, but an angle between the reflective surface RS and the plane is not limited.

An effect that the illumination apparatus 1100 illuminates in the second direction D2 may be referred to as a coaxial lighting effect. An effect that the illumination apparatus 1100 illuminates at various angles may be referred to as a side lighting effect.

The illumination apparatus 1100 having the side lighting effect may be required. As a comparative example, a lighting device may illuminate at various angles by adjusting an angle between a reflective surface and a plane. For example, the lighting device may have the side lighting effect by adjusting the angle between the reflective surface and the plane, but the coaxial lighting effect of the lighting device may be reduced. On the contrary, the illumination apparatus 1100 having the coaxial lighting effect and the side lighting effect at the same time may be required.

The first diffusion plate 510 may be disposed between the main light source 100 and the half mirror 300. The first diffusion plate 510 may not overlap the reflective surface RS. In more detail, the first diffusion plate 510 may not overlap the reflective surface RS in the first direction D1. Also, the first diffusion plate 510 may not overlap the reflective surface RS in the second direction D2.

The first diffusion plate 510 may be parallel to the first direction D1. In more detail, the first diffusion plate 510 may be disposed to be parallel to the plane defined in the first direction D1 and the third direction D3. Accordingly, the first illumination light L11 may not pass through the first diffusion plate 510, and the second illumination light L12 may pass through the first diffusion plate 510.

Since the first diffusion plate 510 may not overlap the reflective surface RS, the first diffusion plate 510 may not reduce the coaxial lighting effect.

The first diffusion plate 510 may have a first horizontal surface HS1 and a second horizontal surface HS2. The second horizontal surface HS2 may be a rear surface of the first horizontal surface HS1. The second illumination light L12 may be incident on the first horizontal surface HS1. The first diffusion plate 510 may scatter the second illumination light L12. The first diffusion plate 510 may transmit the second illumination light L12 incident on the first horizontal surface HS1 and may scatter the second illumination light L12 from the second horizontal surface HS2.

The second illumination light L12 traveling in a linear direction may be scattered by the first diffusion plate 510 to travel in various directions. The scattered light L3 scattered by the second illumination light L12 passing through the first diffusion plate 510 may travel at various angles. The illumination apparatus 1100 may have the side lighting effect by including the first diffusion plate 510. The first diffusion plate 510 may uniformly scatter the second illumination light L12. Any position under or below the first diffusion plate 510 may be uniformly illuminated by the uniform scattered light L3.

As the illumination apparatus 1100 may have the coaxial lighting effect and the uniform side lighting effect, a reliability of the illumination apparatus 1100 may be improved.

In case that the illumination apparatus 1100 may include a separate light source for the side lighting effect, a size of the illumination apparatus 1100 may not be minimized. Since the illumination apparatus 1100 may not include the separate light source for the side lighting effect, the size of the illumination apparatus 1100 may be minimized.

The first diffusion plate 510 may be disposed adjacent to the main light source 100. The first diffusion plate 510 may be disposed adjacent to the main light source 100 in the second direction D2 from the main light source 100. A portion of the first diffusion plate 510 may overlap the main light source 100 in the second direction D2. The second illumination light L12 that does not pass through the first diffusion plate 510 may be minimized. Accordingly, a light amount of the scattered light L3 may increase.

The illumination apparatus 1100 may further include a second diffusion plate 520. The second diffusion plate 520 may be disposed between the half mirror 300 and the first diffusion plate 510. The first diffusion plate 510 may be disposed closer to the main light source 100 than the second diffusion plate 520. The second diffusion plate 520 may be disposed closer to the half mirror 300 than the first diffusion plate 510.

The second diffusion plate 520 may have a first vertical surface VS1 and a second vertical surface VS2. The first vertical surface VS1 may face the main light source 100. The second vertical surface VS2 may face the half mirror 300.

One side or a side of the second diffusion plate 520 may be adjacent to the half mirror 300, and other side or another side of the second diffusion plate 520 may be adjacent to the first diffusion plate 510. One side or a side of the second diffusion plate 520 may contact the half mirror 300, and the other side or another side of the second diffusion plate 520 may contact the first diffusion plate 510.

The second diffusion plate 520 may overlap the reflective surface RS. The second diffusion plate 520 may overlap the reflective surface RS in the first direction D1. The second diffusion plate 520 may be disposed to be perpendicular to the first diffusion plate 510. The first diffusion plate 510 may be disposed parallel to the plane, while the second diffusion plate 520 may be disposed perpendicular to the plane. Accordingly, the first illumination light L11 may pass through the second diffusion plate 520.

The second diffusion plate 520 may uniformly scatter the first illumination light L11. The scattered first illumination light L11 may be reflected from the half mirror 300. Any position under or below the half mirror 300 may be uniformly illuminated by the uniform reflected light L2. As the illumination apparatus 1100 has the uniform coaxial lighting effect and the uniform side lighting effect, the reliability of the illumination apparatus 1100 may be improved.

The first and second diffusion plates 510 and 520 may contact each other. Accordingly, the main illumination light L1 may pass through any one of the first and second diffusion plates 510 and 520. A light amount of the reflected light L2 and the light amount of the scattered light L3 may be maximized.

It is necessary to provide the main illumination light L1 differently according to an information of an inspection object illuminated by the illumination apparatus 1100. For example, in case that the inspection object has a flat surface, the coaxial lighting effect may be required. For another example, in case that the inspection object has a curved surface, the side lighting effect may be required. In case that the main illumination light L1 having the coaxial lighting effect and the side lighting effect is provided to the inspection object at the same time, a light amount of the first illumination light L11 for achieving the coaxial lighting effect may be small. In case that the inspection object requires only the coaxial lighting effect, it is necessary to increase an efficiency of the first illumination light L11 for achieving the coaxial lighting effect.

FIG. 2 is a schematic diagram illustrating an illumination apparatus 1200 according to an embodiment. Same reference numerals are used for same components as components of the illumination apparatus 1100 of FIG. 1, and repeated descriptions of the same components may be omitted. In this embodiment, except for a transfer member 700, components are the same as components of the illumination apparatus 1100 illustrated in FIG. 1.

Referring to FIG. 2, the illumination apparatus 1200 may further include a transfer member 700. The transfer member 700 may move the main light source 100 in the first direction D1. The transfer member 700 may include a head part 710, a cylinder part 730, and a base part 750.

The head part 710 may be connected or coupled to the main light source 100. The head part 710 may move integrally with the main light source 100.

The cylinder part 730 may be connected or coupled to the head part 710. The cylinder part 730 may adjust a length of the cylinder part 730 in the first direction D1. As the length of the cylinder part 730 is adjusted, the head part 710 may move in the first direction D1. As the head part 710 moves in the first direction D1, the main light source 100 may move in the first direction D1. As the length of the cylinder part 730 is adjusted, the head part 710 may move in a direction opposite to the first direction D1. Accordingly, the main light source 100 may move in the opposite direction to the first direction D1.

The base part 750 may be connected or coupled to the cylinder part 730. The base part 750 may be fixed at a preset position.

The transfer member 700 may linearly move the main light source 100 to approach the half mirror 300. The transfer member 700 may linearly move the main light source 100 away from the half mirror 300.

The transfer member 700 is not limited to being driven by the cylinder part 730. It is sufficient if the transfer member 700 may include various mechanical elements capable of linearly moving the main light source 100.

Figure 3:
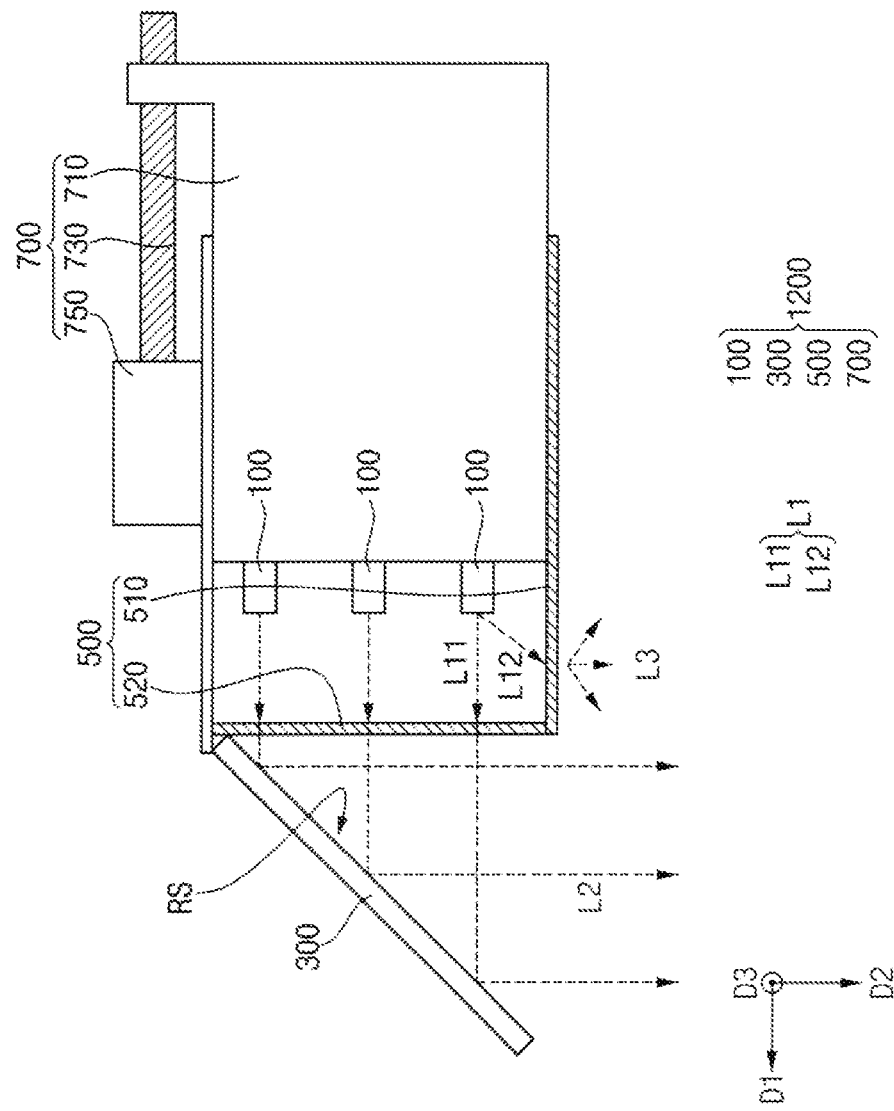
FIGS. 3 and 4 are schematic diagrams illustrating a state in which a main light source included in the illumination apparatus of FIG. 2 is moved through a transfer member.
Figure 4:
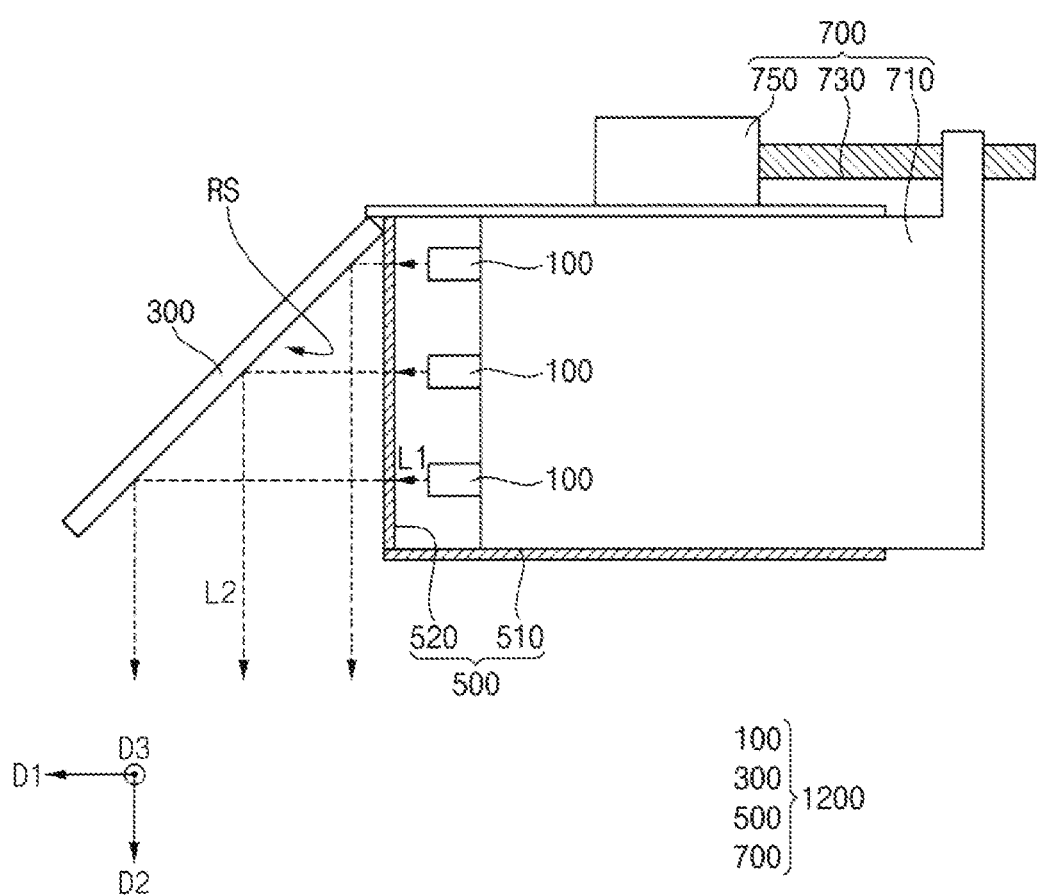

FIGS. 3 and 4 are schematic diagrams illustrating a state in which the main light source 100 included in the illumination apparatus 1200 of FIG. 2 is moved through the transfer member 700.

Referring to FIG. 3, as the length of the cylinder part 730 is adjusted, the head part 710 and the main light source 100 may move in the first direction D1. Accordingly, the main light source 100 may approach the half mirror 300.

As a distance between the main light source 100 and the half mirror 300 reduces, a light amount of the second illumination light L12 passing through the first diffusion plate 510 may reduce. The light amount of the first illumination light L11 passing through the second diffusion plate 520 may increase, and the light amount of the second illumination light L12 passing through the first diffusion plate 510 may reduce. The coaxial lighting effect may increase and the side lighting effect may reduce.

Referring to FIG. 4, as the length of the cylinder part 730 is adjusted, the head part 710 and the main light source 100 may further move in the first direction D1. Accordingly, the main light source 100 may further approach the half mirror 300.

As the distance between the main light source 100 and the half mirror 300 further reduces, the light amount of the second illumination light L12 passing through the first diffusion plate 510 may be minimized. The light amount of the first illumination light L11 passing through the second diffusion plate 520 may be maximized, and the light amount of the second illumination light L12 passing through the first diffusion plate 510 may be minimized. The coaxial lighting effect may be maximized and the side lighting effect may be minimized.

Referring to FIGS. 2 to 4, the transfer member 700 may move the main light source 100 to any position between positions in which the main light source 100 is illustrated. The illumination apparatus 1200 may differently provide the first and second illumination lights L11 and L12 according to information on the inspection object. According to a degree to which the inspection object requires the coaxial lighting effect and the side lighting effect, the illumination apparatus 1200 may provide the first and second illumination lights L11 and L12.

For example, in case that the inspection object requires only the coaxial lighting effect, the transfer member 700 may move the main light source 100 in the first direction D1. Accordingly, the light amount of the first illumination light L11 for achieving the coaxial lighting effect may be increased. For another example, in case that the inspection object simultaneously requires the coaxial lighting effect and the side lighting effect, the transfer member 700 may move the main light source 100 in the direction opposite to the first direction D1. Accordingly, the first and second illumination lights L11 and L12 may be simultaneously provided. For example, the illumination apparatus 1200 may simultaneously provide the coaxial lighting effect and the side lighting effect without the separate light source other than the main light source 100. An efficiency of the main illumination light L1 may be increased. An efficiency of the illumination apparatus 1200 may be improved.

The light amount of the first illumination light L11 may be greater than the light amount of the second illumination light L12. The light amount of the second illumination light L12 passing through the first diffusion plate 510 may be small. Accordingly, since the light amount of the scattered light L3 is small, the side lighting effect may be reduced.

Figure 5:
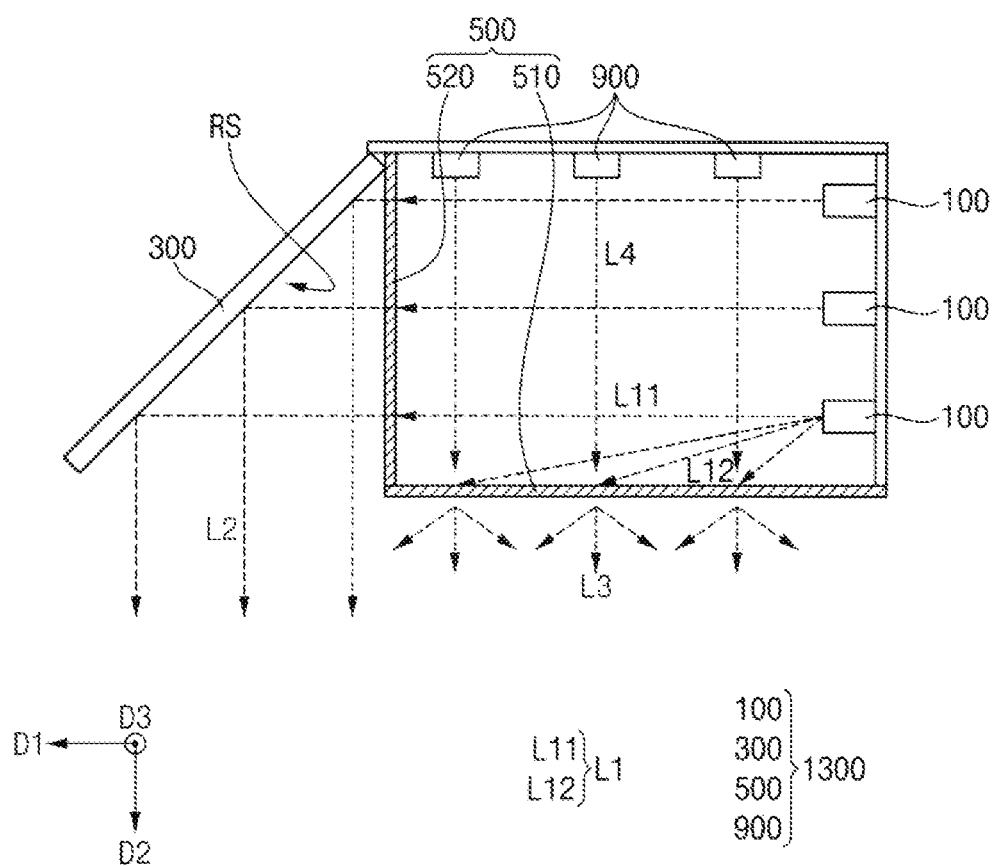
FIG. 5 is a schematic diagram illustrating an illumination apparatus according to an embodiment.

FIG. 5 is a schematic diagram illustrating an illumination apparatus 1300 according to an embodiment. Same reference numerals are used for same components as components of the illumination apparatus 1100 of FIG. 1, and repeated descriptions of the same components may be omitted. In this embodiment, except for an auxiliary light source 900, components are the same as components of the illumination apparatus 1100 illustrated in FIG. 1.

Referring to FIG. 5, the illumination apparatus 1300 may further include an auxiliary light source 900. The auxiliary light source 900 may include a light emitting diode. The auxiliary light source 900 may be disposed on the first diffusion plate 510. The auxiliary light source 900 may emit an auxiliary light or illumination light L4 in the second direction D2. The auxiliary light source 900 may be disposed between the main light source 100 and the half mirror 300. The auxiliary light source 900 may provide the auxiliary illumination light L4 passing through the first diffusion plate 510.

The first diffusion plate 510 may scatter the second illumination light L12 and the auxiliary illumination light L4. The second illumination light L12 and the auxiliary illumination light L4 may be scattered by the first diffusion plate 510 and may travel in various directions. The light amount of the scattered light L3 may increase. As the light amount of the scattered light L3 increases, the side lighting effect of the illumination apparatus 1300 may be maximized.

Figure 6:
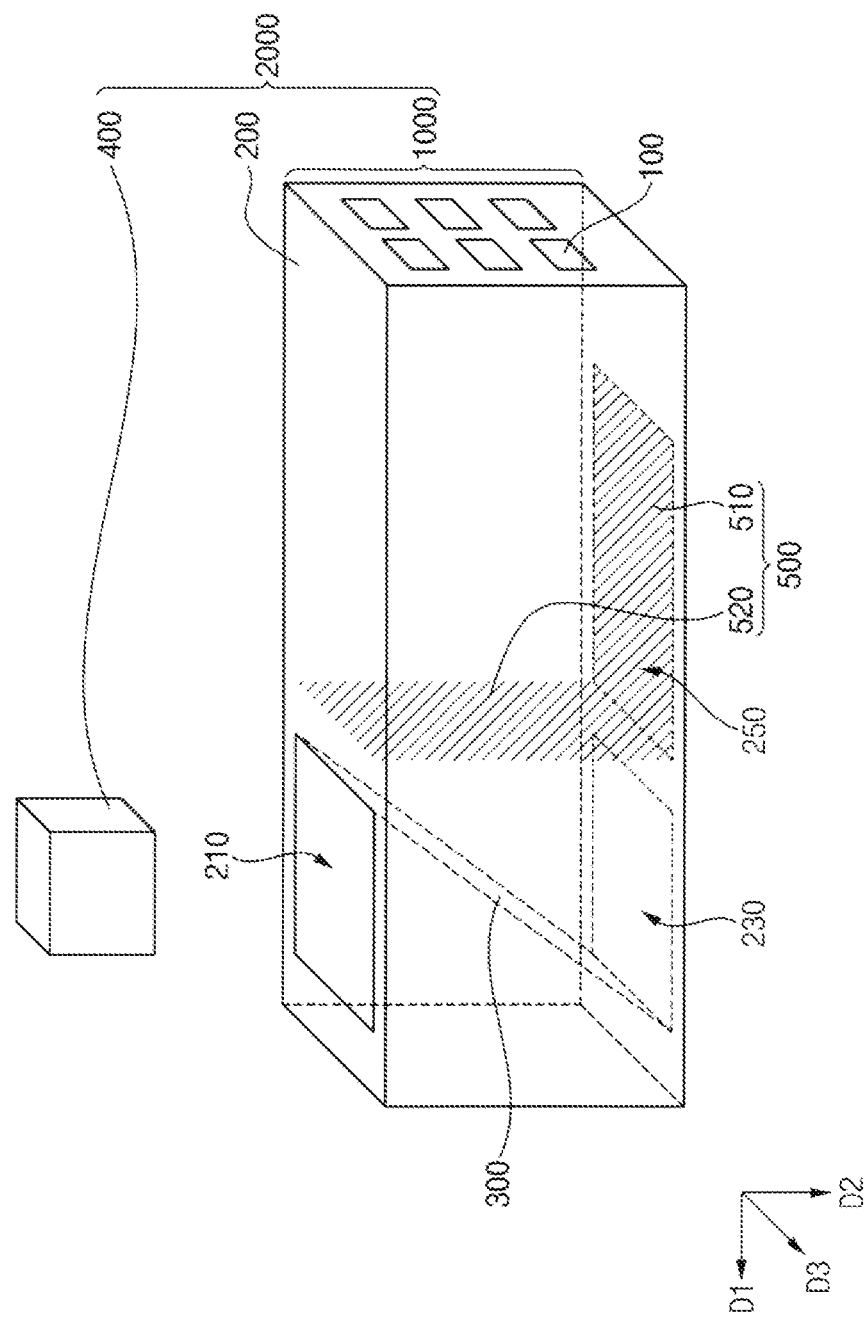
FIG. 6 is a schematic diagram illustrating an optical inspection apparatus according to an embodiment.

FIG. 6 is a schematic diagram illustrating an optical inspection apparatus 2000 according to an embodiment.

Referring to FIG. 6, the optical inspection apparatus 2000 may include an illumination apparatus 1000, a case 200, and a camera 400. The illumination apparatus 1000 may be any one of the illumination apparatus 1100 illustrated in FIG. 1, the illumination apparatus 1200 illustrated in FIG. 2, and the illumination apparatus 1300 illustrated in FIG. 5. In case that the illumination apparatus 1000 is the illumination apparatus 1300 illustrated in FIG. 5, the auxiliary light source 900 may be disposed inside the case 200 and disposed on an upper surface of the case 200.

The illumination apparatus 1000 included in the optical inspection apparatus 2000 may include the main light source 100, the half mirror 300, and the first diffusion plate 510. Same reference numerals are used for same components as components of the illumination apparatuses 1100, 1200 and 1300 of FIGS. 1, 2 and 5, and repeated descriptions of the same components may be omitted.

The case 200 may accommodate the illumination apparatus 1000. The case 200 may accommodate the main light source 100, the half mirror 300, and the first diffusion plate 510. Since the case 200 accommodates the illumination apparatus 1000, the case 200 may prevent transmission of external light to the illumination apparatus 1000. Accordingly, interference between light provided by the illumination apparatus 1000 and the external light may be prevented.

The camera 400 may be disposed outside the case 200. The camera 400 may be disposed on the half mirror 300. The camera 400 may be disposed to be spaced apart from the half mirror 300. The camera 400 may overlap the half mirror 300 in the second direction D2.

The upper surface of the case 200 may have an upper opening 210. A lower surface of the case 200 may have a first lower opening 230 and a second lower opening 250. The first lower opening 230 may face the upper opening 210, and the second lower opening 250 may be spaced apart from the first lower opening 230. The second lower opening 250 may be closer to the main light source 100 than the first lower opening 230.

Referring to FIGS. 1 and 6, the half mirror 300 may be disposed between the upper opening 210 and the first lower opening 230. The half mirror 300 may be disposed inside the case 200, and the half mirror 300 may be disposed to overlap the upper opening 210 and the first lower opening 230 in the second direction D2. The half mirror 300 may reflect the first illumination light L11 in the second direction D2, and the reflected light L2 may travel in the second direction D2 through the first lower opening 230.

The first diffusion plate 510 may be disposed in the second lower opening 250. The first diffusion plate 510 may transmit the second illumination light L12 incident on the first horizontal surface HS1 and may scatter the second illumination light L12 from the second horizontal plane HS2. The scattered light L3 may uniformly illuminate an arbitrary position under or below the first diffusion plate 510 through the second lower opening 250.

FIGS. 7A and 7B are schematic diagrams illustrating an inspection method using the optical inspection apparatus 2000 of FIG. 6.

Referring to FIGS. 6 and 7A, an inspection object 3000 may be provided under or below the optical inspection apparatus 2000. For example, the inspection object 3000 may include a display panel DP and a flexible printed circuit board FPCB. The illumination apparatus 1000 may provide the reflected light L2 to the inspection object 3000, so that the illumination apparatus 1000 may have the coaxial lighting effect.

The reflected light L2 provided to the inspection object 3000 may be reflected from the inspection object 3000. A first light reflected from the inspection object 3000 may be incident on the half mirror 300 through the first lower opening 230. The first light incident on the half mirror 300 may pass through the half mirror 300. A second light passing through the half mirror 300 may be incident on the camera 400. The camera 400 may photograph the inspection object 3000 by using the incident light L5 incident on the camera 400.

The camera 400 may overlap the inspection object 3000 and the half mirror 300. The camera 400 may overlap the inspection object 3000 and the half mirror 300 in the second direction D2. The camera 400 may photograph the inspection object 3000 through the upper opening 210 and the first lower opening 230.

The inspection object 3000 may simultaneously require the coaxial lighting effect and the side lighting effect.

Referring to FIGS. 6 and 7B, the inspection object 3000 may have a flat upper surface or a substantially a flat upper surface and a curved side surface or a substantially curved side surface. For example, the flexible printed circuit board FPCB attached under or below the display panel DP may be bent. As the flexible printed circuit board FPCB is bent, the inspection object 3000 may have the curved side surface. The illumination apparatus 1000 may provide the scattered light L3 to illuminate the curved side surface. The illumination apparatus 1000 may provide the reflected light L2 and the scattered light L3 to simultaneously illuminate the flat upper surface and the curved side surface. According to the information of the inspection object 3000, the illumination apparatus 1000 may have the coaxial lighting effect and the side lighting effect at the same time.

As an example in which the inspection method of the optical inspection apparatus 2000 is used, a bending process may be used. In case that the optical inspection apparatus 2000 is applied to the bending process, the optical inspection apparatus 2000 may inspect an arrangement state of the display panel DP and the flexible printed circuit board FPCB.

FIG. 8 is a schematic plan view of the inspection object 3000 of FIG. 7A being photographed through the optical inspection apparatus 2000.

Referring to FIGS. 7A and 8, a portion of the flexible printed circuit board FPCB may overlap the display panel DP. The portion of the flexible printed circuit board FPCB may be attached to a bottom surface of the display panel DP.

First marks MK11 and MK12 may be formed on the surface of the flexible printed circuit board FPCB. Second marks MK21 and MK22 may be formed on the surface of the display panel DP. Before the inspection object 3000 is provided under or below the optical inspection apparatus 2000, the first and second marks MK11, MK12, MK21, and MK22 may be formed.

The optical inspection apparatus 2000 may photograph the first and second marks MK11, MK12, MK21, and MK22. In case that the optical inspection apparatus 2000 recognizes the first and second marks MK11, MK12, MK21, and MK22, the flexible printed circuit board FPCB may be bent. After the first and second marks MK11, MK12, MK21, and MK22 are recognized, the bending process may be performed.

Figure 9:
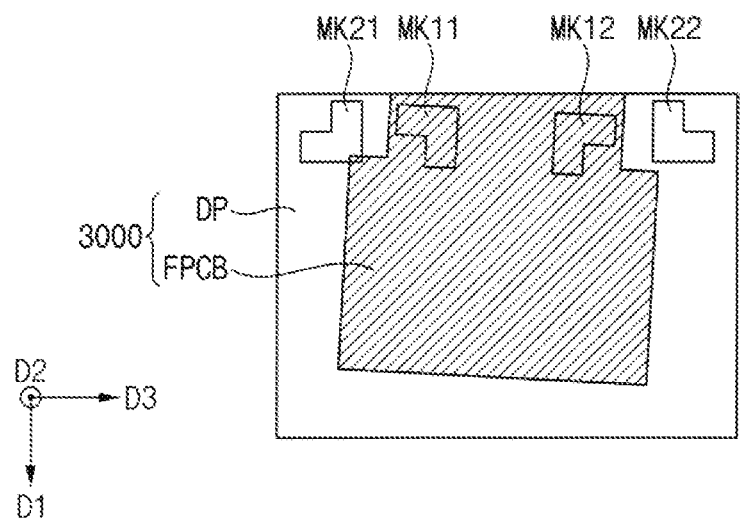
FIGS. 9 and 10 are schematic plan views of an inspection object of FIG. 7B being photographed through an optical inspection apparatus.
Figure 10:
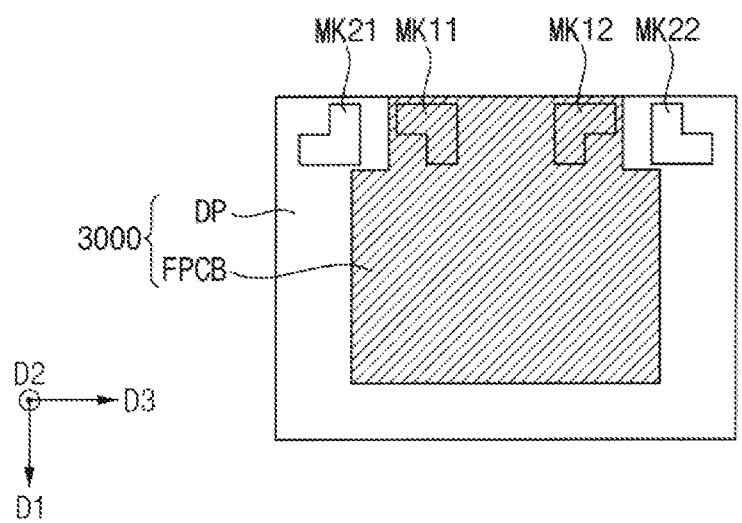

FIGS. 9 and 10 are schematic plan views of the inspection object 3000 of FIG. 7B being photographed through an optical inspection apparatus 2000.

Referring to FIG. 9, that the display panel DP and the flexible printed circuit board FPCB are bent out of a preset arrangement may be recognized through the first and second marks MK11, MK12, MK21, and MK22 photographed by the optical inspection apparatus 2000.

Referring to FIG. 10, that the display panel DP and the flexible printed circuit board FPCB are bent in the preset arrangement may be recognized through the first and second marks MK11, MK12, MK21, and MK22 photographed by the optical inspection apparatus 2000.

Referring to FIGS. 7A, 7B, 8 and 10, the inspection object 3000 may be provided under or below the optical inspection apparatus 2000. The first and second marks MK11, MK12, MK21, and MK22 may be photographed using the coaxial lighting effect of the illumination apparatus 1000. In case that the first and second marks MK11, MK12, MK21, and MK22 are not recognized, the first and second marks MK11, MK12, MK21, and MK22 may be photographed using the coaxial lighting effect and the side lighting effect of the illumination apparatus 1000. In case that the first and second marks MK11, MK12, MK21, and MK22 are recognized, the bending process may be performed. In case that the inspection object 3000 is bent out of the preset arrangement, a position of the inspection object 3000 may be revised. In case that the inspection object 3000 is bent in the preset arrangement, the bending process may be terminated.

The illumination apparatus 1000 provides light according to the information of the inspection object 3000, so that the reliability of the illumination apparatus 1000 may be improved. Reliability of the optical inspection apparatus 2000 may be improved. The optical inspection apparatus 2000 may find a defect in the inspection object 3000 or may inspect a quality of the inspection object 3000.

As a radius of curvature of the curved side surface of the inspection object 3000 increases, the main light source 100 may be linearly moved away from the half mirror 300 by using the transfer member 700.

Although the bending process has been described as an example in which the inspection method of the optical inspection apparatus 2000 is used, the inspection method of the optical inspection apparatus 2000 is not limited. As another example, the optical inspection apparatus 2000 may be used to inspect a foreign material on the surface of the inspection object 3000.

Although embodiments and implementations have been described herein, other embodiments and modifications will be apparent from the description. Accordingly, the disclosure is not limited to the described embodiments, but rather also to the broader scope of the disclosure and various modifications and equivalent arrangements as would be apparent to a person of ordinary skill in the art.

What is claimed is:

1. An illumination apparatus comprising:
a main light source emitting a main light;
a half mirror spaced apart from the main light source, the half mirror including a reflective surface reflecting a first light travelling in a first direction among the main light to travel in a second direction different from the first direction; and
a first diffusion plate disposed between the main light source and the half mirror, the first diffusion plate not disposed directly between the main light source and the reflective surface of the half mirror such that first light emitted from the main light source along the first direction to the half mirror does not pass through the first diffusion plate, the first diffusion plate including a first horizontal surface and a second horizontal surface, wherein
the second horizontal surface is a rear surface of the first horizontal surface,
the first diffusion plate transmits a second light incident on the first horizontal surface of the first diffusion plate among the main light, and
the first diffusion plate scatters the second light from the second horizontal surface of the first diffusion plate.

2. The illumination apparatus of claim 1, wherein the second light travels in a direction different from the first direction and the second direction.

3. The illumination apparatus of claim 1, wherein the first horizontal surface of the first diffusion plate is parallel to the first direction and the first diffusion plate is disposed adjacent to the main light source.

4. The illumination apparatus of claim 1, further comprising:
a second diffusion plate different from the first diffusion plate, the second diffusion plate disposed directly between the main light source and the reflective surface of the half mirror such that the first light emitted from the main light source along the first direction to the half mirror does pass through diffusion plate.

5. The illumination apparatus of claim 4, wherein the second diffusion plate includes:
a first vertical surface facing the main light source; and
a second vertical surface facing the half mirror.

6. The illumination apparatus of claim 4, wherein the second diffusion plate overlaps the reflective surface of the half mirror in the first direction.

7. The illumination apparatus of claim 4, wherein
a side of the second diffusion plate is adjacent to the half mirror, and
another side of the second diffusion plate is adjacent to the first diffusion plate.

8. The illumination apparatus of claim 4, wherein the first diffusion plate contacts the second diffusion plate.

9. The illumination apparatus of claim 1, further comprising:
a transfer member moving the main light source in the first direction.

10. The illumination apparatus of claim 9, wherein the transfer member includes:
a head part connected to the main light source;
a cylinder part connected to the head part and adjusting a length of the cylinder part in the first direction; and
a base part connected to the cylinder part and fixed at a preset position.

11. The illumination apparatus of claim 1, further comprising:
an auxiliary light source disposed on the first diffusion plate, the auxiliary light source emitting an auxiliary light in the second direction.

12. The illumination apparatus of claim 11, wherein the auxiliary light source is disposed between the main light source and the half mirror.

13. An optical inspection apparatus comprising:
an illumination apparatus including:
a main light source emitting a main light;
a half mirror spaced apart from the main light source, the half mirror including a reflective surface reflecting a first light travelling in a first direction among the main light to travel in a second direction different from the first direction; and
a first diffusion plate disposed between the main light source and the half mirror, the first diffusion plate not disposed directly between the main light source and the reflective surface of the half mirror such that first light emitted from the main light source along the first direction to the half mirror does not pass through the first diffusion plate, the first diffusion plate including a first horizontal surface and a second horizontal surface;
a case accommodating the illumination apparatus; and
a camera disposed outside of the case and disposed on the half mirror, wherein
the second horizontal surface is a rear surface of the first horizontal surface,
the first diffusion plate transmits a second light incident on the first horizontal surface of the first diffusion plate among the main light, and
the first diffusion plate scatters the second light from the second horizontal surface of the first diffusion plate.

14. The optical inspection apparatus of claim 13, wherein the camera overlaps the half mirror in the second direction.

15. The optical inspection apparatus of claim 13, wherein
an upper surface of the case includes an upper opening, and
a lower surface of the case includes:
a first lower opening facing the upper opening; and
a second lower opening spaced apart from the first lower opening of the lower surface of the case.

16. The optical inspection apparatus of claim 15, wherein the half mirror is disposed directly between the upper opening and the first lower opening of the lower surface of the case.

17. The optical inspection apparatus of claim 15, wherein the first diffusion plate is disposed in the second lower opening of the lower surface of the case.

18. The optical inspection apparatus of claim 13, wherein the illumination apparatus further includes a transfer member moving the main light source in the first direction.

19. The optical inspection apparatus of claim 13, wherein the illumination apparatus further includes an auxiliary light source disposed on the first diffusion plate, the auxiliary light source emitting an auxiliary light in the second direction.

20. The optical inspection apparatus of claim 19, wherein
the auxiliary light source is disposed between the main light source and the half mirror, and
the auxiliary light source is disposed on the upper surface of the case.

* * * * *